(12) United States Patent
Lee

(10) Patent No.: US 7,496,269 B1
(45) Date of Patent: Feb. 24, 2009

(54) FIBER OPTIC ENCLOSURE

(75) Inventor: Scott David Lee, Terrigal (AU)

(73) Assignee: ADC GmbH (DE)

( * ) Notice: Subject to any disclaimer, the term of this patent is extended or adjusted under 35 U.S.C. 154(b) by 0 days.

(21) Appl. No.: 11/734,416

(22) Filed: Apr. 12, 2007

(51) Int. Cl.
G02B 6/00 (2006.01)

(52) U.S. Cl. ........................................ 385/135; 385/134

(58) Field of Classification Search ................. 385/135
See application file for complete search history.

(56) References Cited

U.S. PATENT DOCUMENTS

| | | | |
|---|---|---|---|
| 4,949,376 A | 8/1990 | Nieves et al. | |
| 5,109,467 A | 4/1992 | Hogan | |
| 5,119,459 A * | 6/1992 | Meyerhoefer et al. | 385/135 |
| 5,490,229 A * | 2/1996 | Ghandeharizadeh et al. | 385/135 |
| 5,511,144 A | 4/1996 | Hawkins | |
| 5,708,751 A * | 1/1998 | Mattei | 385/135 |
| 5,828,807 A | 10/1998 | Tucker | |
| 5,982,972 A | 11/1999 | Tucker | |
| 6,009,223 A * | 12/1999 | Arizpe | 385/134 |
| 6,118,868 A | 9/2000 | Daoud | |
| 6,201,920 B1 * | 3/2001 | Noble et al. | 385/134 |
| 6,291,767 B1 | 9/2001 | Beecher, II | |
| 6,321,017 B1 | 11/2001 | Janus | |
| 6,356,697 B1 | 3/2002 | Braga | |
| 6,385,381 B1 | 5/2002 | Janus | |
| 6,591,053 B2 * | 7/2003 | Fritz | 385/135 |
| 6,621,975 B2 | 9/2003 | Laporte | |
| 6,661,961 B1 | 12/2003 | Allen | |
| 6,721,484 B1 | 4/2004 | Blankenship | |
| 6,815,612 B2 | 11/2004 | Bloodworth | |
| 6,912,349 B2 * | 6/2005 | Clark et al. | 385/134 |
| 6,980,725 B1 * | 12/2005 | Swieconek | 385/135 |
| 2001/0036351 A1 | 11/2001 | Fritz | |
| 2006/0254795 A1 | 11/2006 | Thrift et al. | |

OTHER PUBLICATIONS

ADC® Telecommunications, *FTUA 4- and 12-Fiber Wall Box User Manual*, ADCP-90-240, Issue 2, Mar. 1997, pp. 1-14.

ADC® Telecommunications, *Wall Mount Box 12/24/36 Fiber User Manual*, ADCP-90-149, Issue 3, Jul. 1997, pp. 1-14 with Appendix pp. A1-A2.

24-Fiber Wall-Mount Box FPL Duplex Adapters, ADC Telecommunications; Fiber Panel Products—Specialty Panels, Jul. 1996, p. 65.

(Continued)

Primary Examiner—Frank G Font
Assistant Examiner—Ryan Lepisto
(74) Attorney, Agent, or Firm—Merchant & Gould, P.C.

(57) ABSTRACT

A fiber optic enclosure for enclosing optical fiber connections includes a housing, a bulkhead, and a cover assembly. The housing has a base and a first sidewall oppositely disposed from a second sidewall. The base and the first and second sidewalls, which extend outwardly from the base, define an interior region with an open-front portion and an open-side portion. The bulkhead is disposed in the interior region of the housing. The cover assembly has a first cover plate that has a first end portion pivotally engaged with the housing and a second end portion pivotally engaged with a second cover plate. The first cover plate closes the open-side portion of the housing and the second cover plate closes at least a portion of the open-front portion of the housing when the cover assembly is in a closed position.

12 Claims, 11 Drawing Sheets

OTHER PUBLICATIONS

FL1000—Customer Premises Fiber Distribution Products, ADC Telecommunications; © 1998, pp. 1-8.

FONS Small Termination Interconnect Cabinet; FONS® Fiber Optic Network Solutions, now part of ADC Telecommunications, Inc., FONS Corp. © 2005, 2 pages.

FONS LX-10 Series Cabinets, Wall Mount Enclosures, FONS® Fiber Optic Network Solutions, now part of ADC Telecommunications, Inc., FONS Corp. © 2005, pp. 1-3.

FONS Wall Mount Patch/Splice Enclosure, Indoor Wall Mount Terminals, FONS® Fiber Optic Network Solutions, now part of ADC Telecommunications, Inc., FONS Corp. © 2005, 1 page.

FONS TIC Series Cabinets, Indoor Wall Mount Terminals, FONS® Fiber Optic Network Solutions, now part of ADC Telecommunications, Inc., FONS Corp. © 2005, pp. 1-3.

International Search Report and Written Opinion mailed Aug. 6, 2008.

* cited by examiner

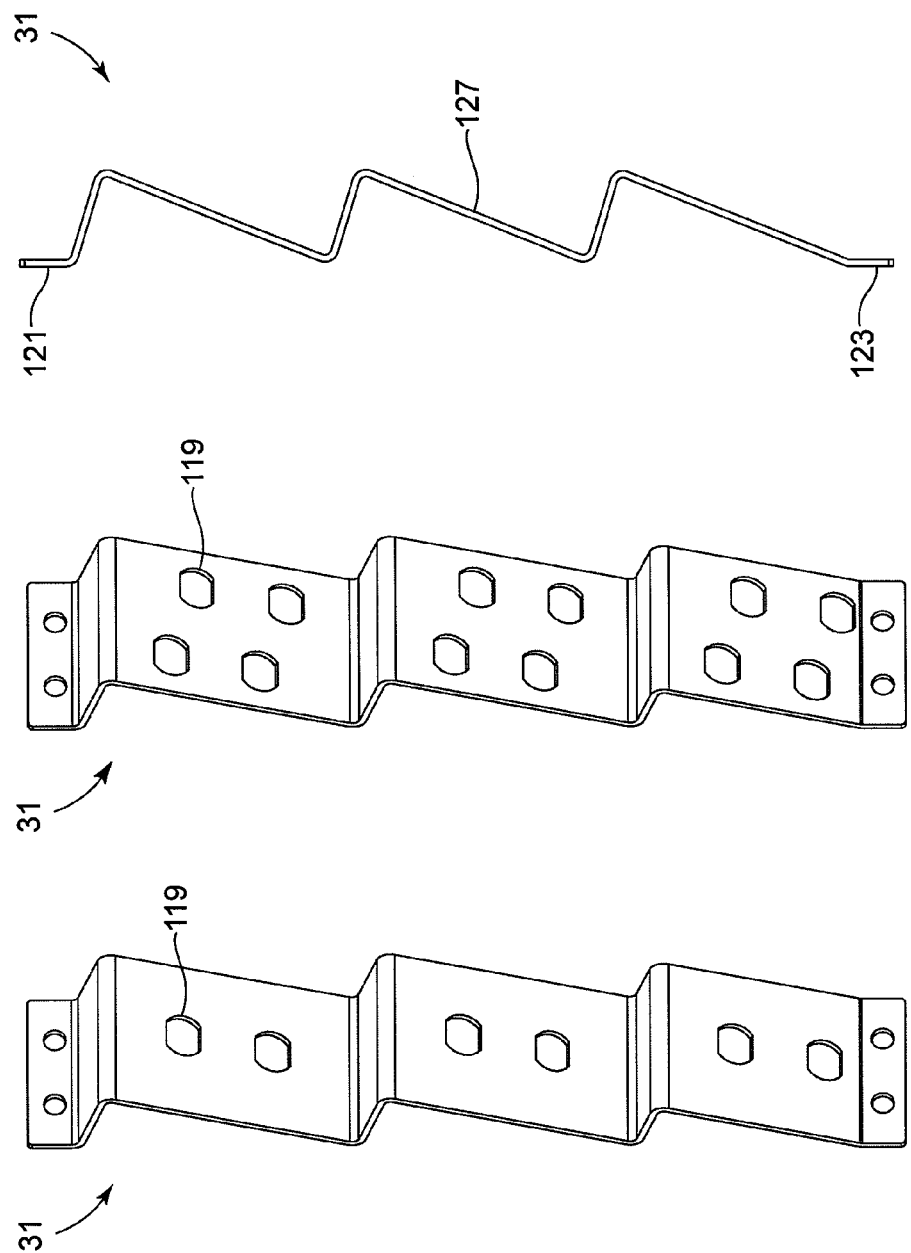

FIBER OPTIC ENCLOSURE

TECHNICAL FIELD

The present invention relates to fiber optic enclosures, and more particularly, to fiber optic wall box enclosures.

BACKGROUND

As demand for telecommunications increases, optical fiber services are being extended in more and more areas. To more efficiently extend the fiber optic service into areas where current and future customers are located, often distribution cables with more than one optical fiber are utilized. To provide service, for example, in a multiple dwelling unit, the distribution cables may be received within a fiber optic enclosure. Such enclosures provide locations where one or more optical fibers of the distribution cable may be accessed from the distribution cable.

Often times, however, access to the optical fibers contained in the fiber optic enclosure is limited due to space constraints which affect the physical location of the fiber optic enclosure. For example, many times, fiber optic enclosures must be located in a corner or next to another fiber optic enclosure thereby making it difficult for technicians to gain access to the interior of the fiber optic enclosure.

SUMMARY

One aspect of the present disclosure relates to a fiber optic enclosure for enclosing optical fiber connections comprising a housing, a bulkhead, and a cover assembly. The housing includes a base and a first sidewall oppositely disposed from a second sidewall. The base and the first and second sidewalls, which extend outwardly from the base, define an interior region with an open-front portion and an open-side portion. The bulkhead is disposed in the interior region of the housing. The cover assembly includes a first cover plate that has a first end portion pivotally engaged with the housing and a second end portion pivotally engaged with a second cover plate. The first cover plate closes the open-side portion of the housing and the second cover plate closes at least a portion of the open-front portion of the housing when the cover assembly is in a closed position.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the present invention and many of the attendant advantages of the present invention will be readily appreciated as the present invention becomes better understood by reference to the following Detailed Description when considered in connection with the accompanying drawings, and wherein:

FIG. 13 is an alternate embodiment of an adapter plate of the bulkhead of FIG. 8.

FIG. 14 is an alternate embodiment of an adapter plate of the bulkhead of FIG. 8.

FIG. 15 is a view of the adapter plate taken on line 15-15 in FIG. 9.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
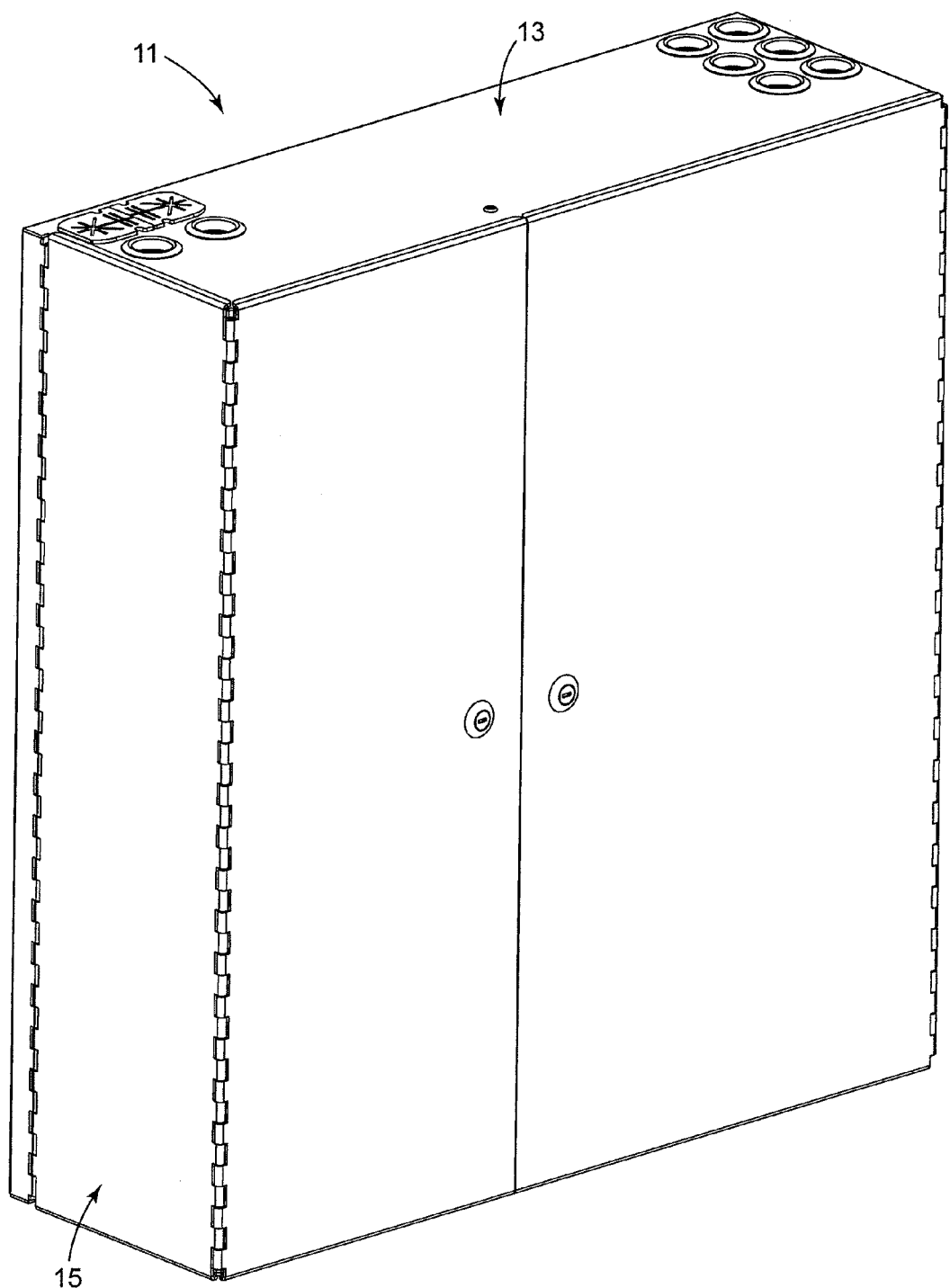
FIG. 1 is a perspective view of a fiber optic enclosure made in accordance with the present invention.

Referring now to FIG. 1, a fiber optic enclosure, generally designated 11, is shown. The fiber optic enclosure 11 encloses optical fiber connections between incoming fiber and outgoing fiber so as to establish a desired optical connection. Examples of incoming fiber include fibers of a feeder cable from a service provider and intermediate fibers that connect the feeder cable fibers to a termination region (e.g., connectorized pigtails extending from splice trays and patching fibers/jumpers). Examples of outgoing fibers include the subscriber cable fibers that exit the fiber optic enclosure 11 and any intermediate fibers connected to the subscriber cable fibers. The fiber optic enclosure 11 of the subject embodiment will be described in the present disclosure as being mounted to a wall in a multiple-dwelling unit, such as an apartment building or a condominium. While it will be understood by those skilled in the art after reviewing the present disclosure that the scope of the present invention is not limited to wall-mounted fiber optic enclosures, the present invention will be described as such for ease of description. In the subject embodiment, the modular fiber optic enclosure 11 includes a housing, generally designated 13, and a cover assembly, generally designated 15.

Figure 2:
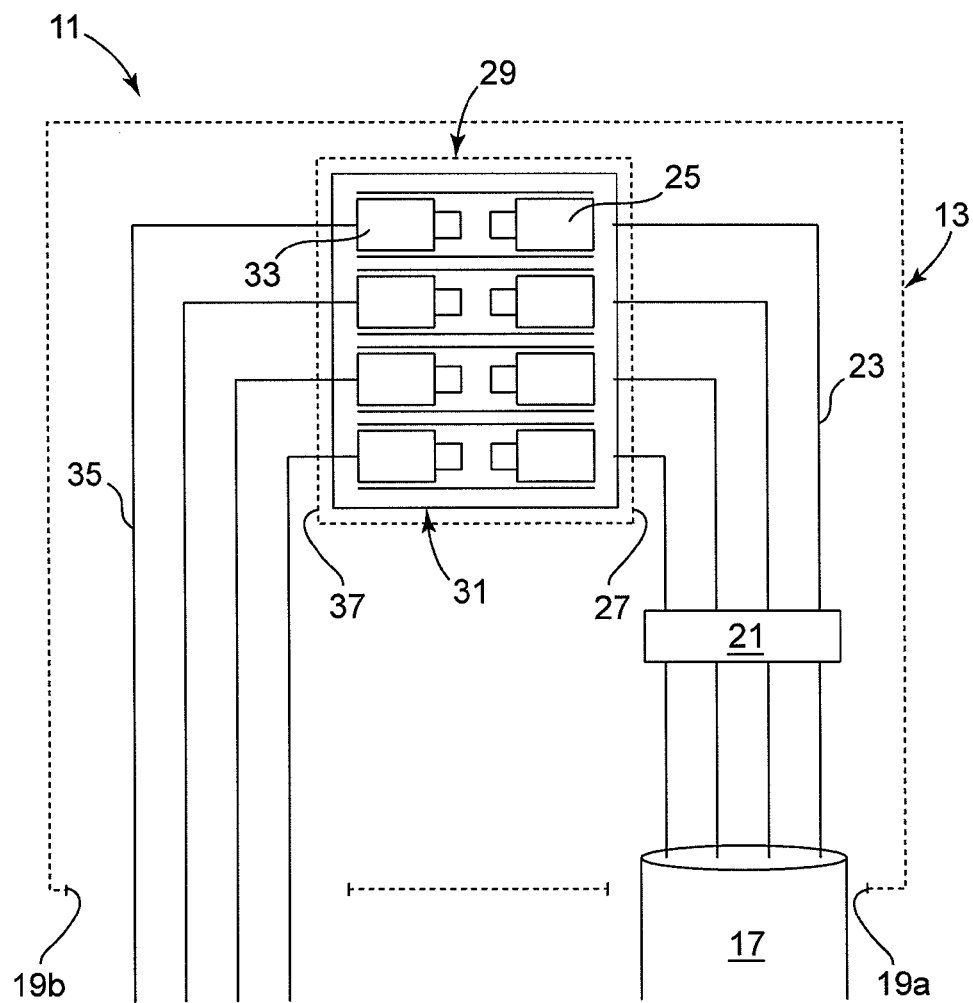
FIG. 2 is a cable routing schematic of the fiber optic enclosure of FIG. 1.

Referring now to FIG. 2, a schematic representation of a pass-through cable routing scheme for the fiber optic enclosure 11 is shown. A multi-fiber feeder cable 17 is routed into the fiber optic enclosure 11 through a cable port 19a in the housing 13. The multi-fiber feeder cable includes a plurality of optical fibers. Within the housing 13 of the modular fiber optic enclosure 11, the optical fibers of the feeder cable 17 are directed to a splice tray 21, where one or more of the fibers of the feeder cable 17 are individually connected to pigtails 23, each having a connectorized end 25. The pigtails 23 each include an optical fiber surrounded by a cladding and at least one protective coating. A buffer layer can surround the protective coating of each of the pigtails 23. In one embodiment, the buffer layer can have an outer diameter of about 900 µm. The pigtails 23 are routed to a first side 27 of a bulkhead, generally designated 29, of the fiber optic enclosure 11. The bulkhead 29 includes a plurality of adapter plates, generally designated 31. At the adapter plate 31, the connectorized ends 25 of the pigtails 23 are connected to connectorized ends 33 of subscriber cables 35, where the connectorized ends 33 are disposed on a second side 37 of the bulkhead 29. The bulkhead 29, therefore, is the dividing line between the incoming fibers and the outgoing fibers. In the subject embodiment, the subscriber cables 35 are more robust than the pigtails 23. The subscriber cables 35 include an optical fiber surrounded by a cladding, at least one protective coating, and a buffer layer. For example, the subscriber cables 35 can include a strength layer that surrounds the buffer layer and an outer jacket that surrounds the strength layer. In one embodiment, the outer diameter of the outer diameter of the outer jacket can be about 2 mm. The subscriber cables 35 are then routed from the second side 37 of the bulkhead 29 through a cable port 19b and out of the housing 13 of the fiber optic enclosure 11.

Figure 3:
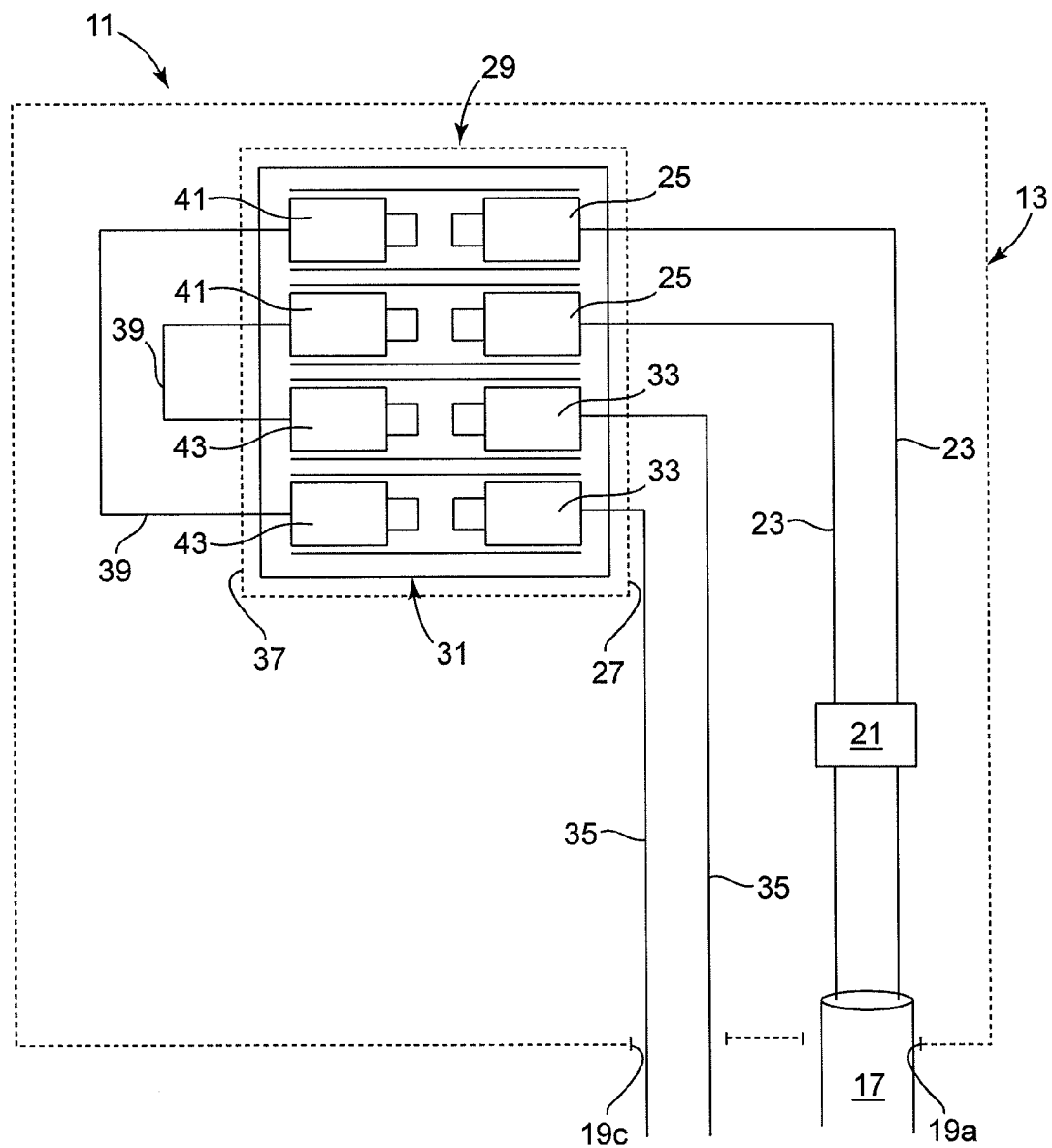
FIG. 3 is an alternate embodiment of a cable routing schematic of the fiber optic enclosure of FIG. 1.

Referring now to FIG. 3, a schematic representation of a cross-connection cable routing scheme for the fiber optic enclosure 11 is shown. In this cable routing scheme, the multi-fiber feeder cable 17 is routed into the fiber optic enclosure 11 through the cable port 19a in the housing 13. The feeder cable 17 is directed to the splice tray 21, where each of the fibers of the feeder cable 17 are connected to the corresponding pigtail 23, with each pigtail 23 having the connectorized end 25. The pigtails 23 are routed to the first side 27 of the bulkhead 29. Jumper cables 39 are in connected engagement with the adapter plate 31 on the second side 37 of the bulkhead 29. Each jumper cable 39 includes an optical fiber surrounded by a cladding and at least one protective coating, with a buffer layer surrounding the protective coating. The jumper cables 39 are typically shorter cables having first and second connectorized ends 41, 43 disposed on opposite ends of each jumper cable 39. The first connectorized end 41 of the jumper cable 39 is connected to the connectorized end 25 of the pigtails 23 while the second connectorized end 43 of the jumper cable 39 is connected to the connectorized end 33 of the distribution cable 35. As both the connectorized ends 25 of the pigtails 23 and the connectorized ends 33 of the subscriber cables 35 are in connected engagement with the adapter plate 31 on the first side 27 of the bulkhead 29, the jumper cables 39 serve as a conduit to connect the pigtails 23, which are disposed on the first side 27 of the bulkhead 29, to the subscriber cables 35, which are also disposed on the first side 27 of the bulkhead 29. With the subscriber cables 35 in connected engagement with the pigtails 23 through the jumper cables 39, the subscriber cables 35 are then routed out of the housing 13 through a cable port 19c.

As is well known to those skilled in the art, fan-out devices are typically used in enclosures to separate fibers in a multi-fiber cable, such as a ribbon cable, or to recombine separate fibers into a multi-fiber cable. While fan-out devices have not been shown in FIGS. 2 and 3, it will be understood by those skilled in the art that in many applications of the fiber optic enclosure 11, fan-out devices would be necessary.

Figure 4:
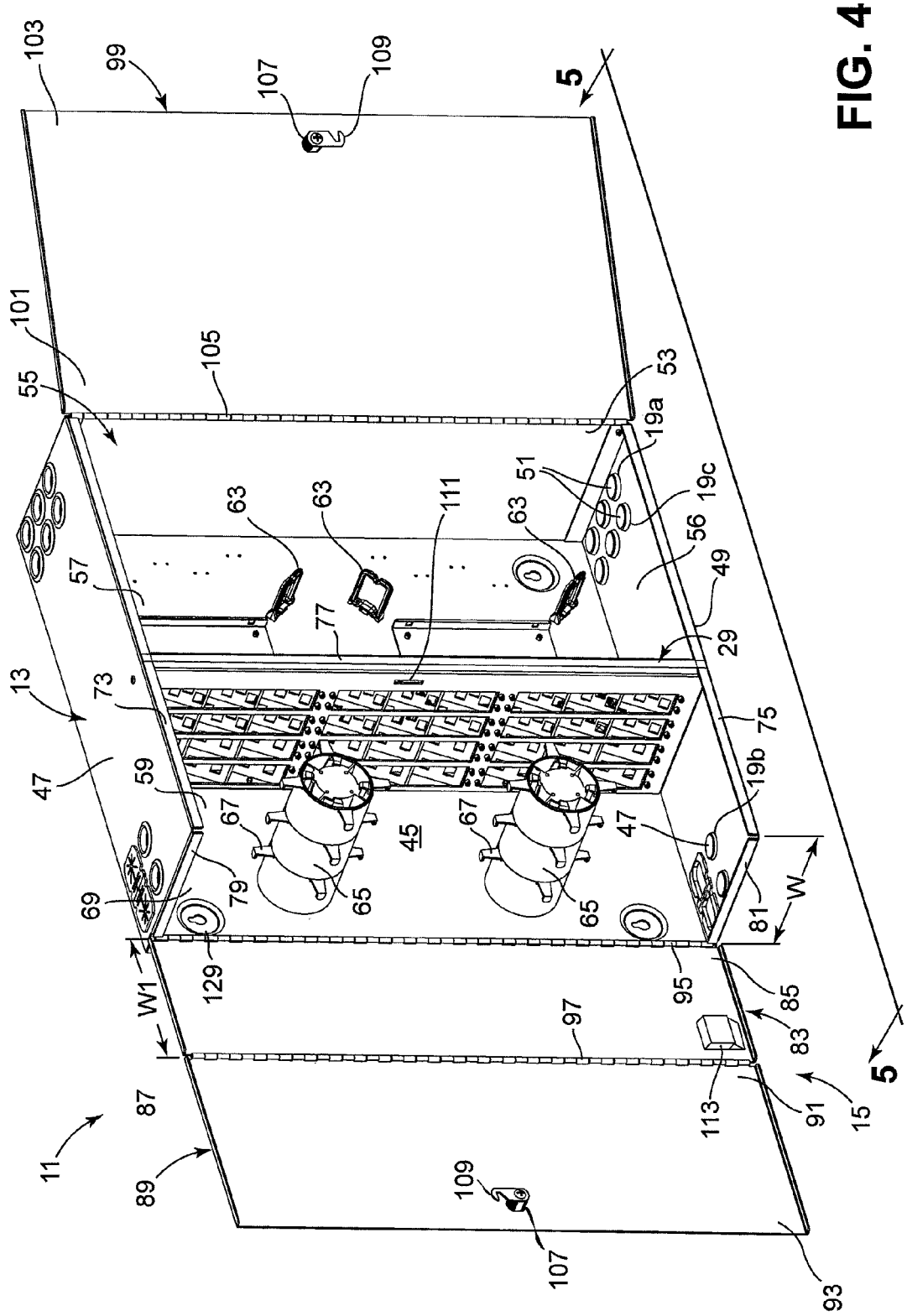
FIG. 4 is a perspective view of the fiber optic enclosure of FIG. 1.
Figure 5:
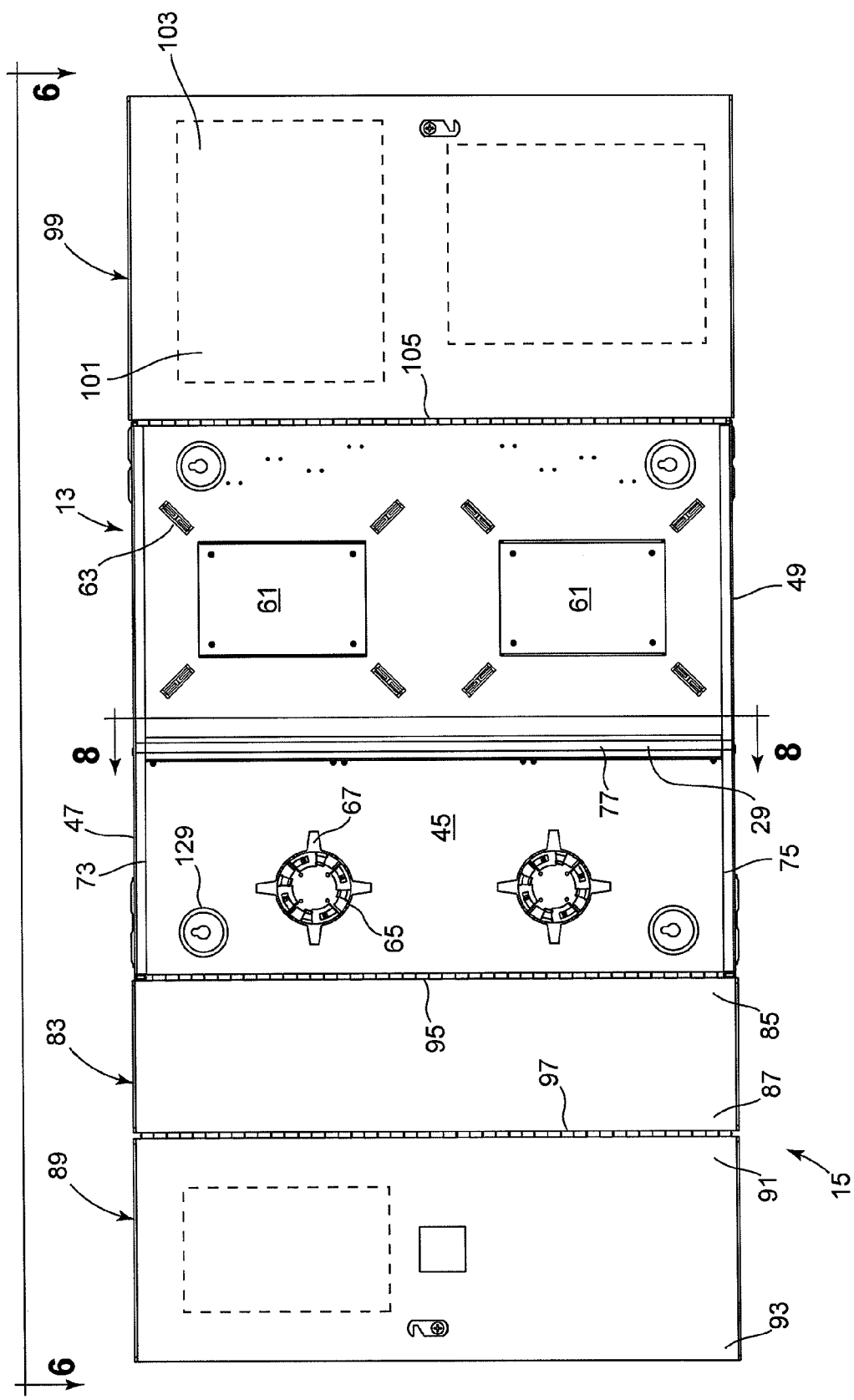
FIG. 5 is a view of the fiber optic enclosure taken on line 5-5 in FIG. 4.
Figure 6:
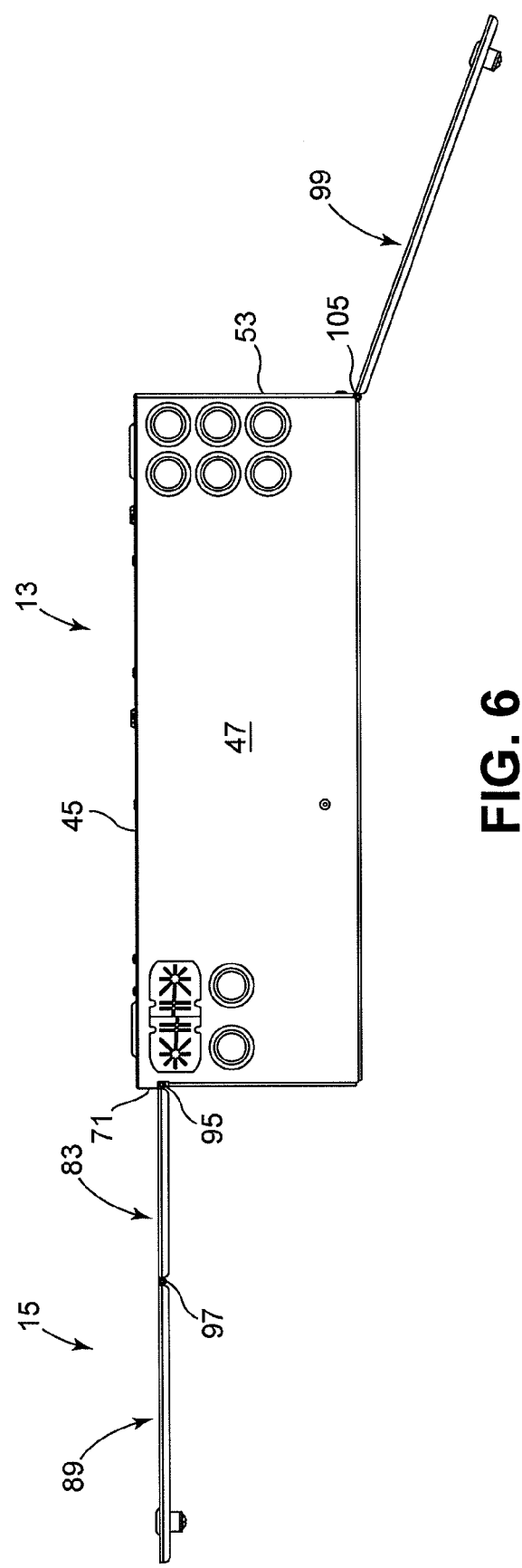
FIG. 6 is a view of the fiber optic enclosure taken on line 6-6 in FIG. 5.

Referring now to FIGS. 4-6, the fiber optic enclosure 11 will be described in greater detail. The housing 13 includes a base 45, a first sidewall 47 (e.g., a top sidewall) and an oppositely disposed second sidewall 49 (e.g., a bottom sidewall) that extend generally perpendicularly from the outer periphery of the base 45. The first and second sidewalls 47, 49 include "punch-out" areas 51, which are designed to be removed, or "punched out", as needed. With the punch-out areas 51 removed, the cable ports 19 are exposed. The feeder and distribution cables 17, 35 are fed through the cable ports 19 so as to provide a point of entry for the feeder and distribution cables 17, 35 into the housing 13.

In the subject embodiment, a third sidewall 53, which extends generally perpendicularly from the outer periphery of the base 45, is in connected engagement with the first and second sidewalls 47, 49. The base 45 and the first, second and third sidewalls 47, 49, 53 cooperate to define an interior region, generally designated 55, having an open-front portion 56. In the subject embodiment, the interior region 55 of the housing 13 includes a first region 57 and a second region 59. The first region 57 is separated from the second region 59 by the bulkhead 29, which traverses the interior region 55 of the housing 13 between the first and second sidewalls 47, 49. The first region 57 includes splice tray mounts 61 disposed on the base 45 for mounting the splice trays 21 (shown only schematically in FIGS. 2 and 3) and cable management loops 63 mounted to the base 45 around each of the splice tray mounts 61 for storing and routing excess lengths of feeder and/or distribution cable 17, 35. The second region 59 of the interior region 55 of the housing 13 includes cable spools 65 mounted to the base 45 of the housing 13 in a stacked configuration. The cable spools 65 include a plurality of retaining tabs 67 that function to retain the distribution or jumper cables 35, 39 on the cable spools 65.

The first and second sidewalls 47, 49 of the housing 13 define an open-side portion 69 disposed between the first and second sidewalls 47, 49 and adjacent the second region 59 of the interior region 55. The open-side portion 69 has a width W as shown in FIG. 4. In the subject embodiment, the open-side portion 69 is further defined by a lip 71, which extends generally perpendicularly from the outer periphery of the base 45 and is in connected engagement with the first and second sidewalls 47, 49. As best shown in FIG. 6, the lip 71 does not extend the full width of the first and second sidewalls 47, 49. It will be understood, however, by those skilled in the art that the scope of the present invention is not limited to the use of the lip 71.

The first and second sidewalls 47, 49 of the housing 13 and the bulkhead 29 include front edges 73, 75, 77, respectively, that are generally coplanar. In addition, the first and second sidewalls 47, 49 include side edges 79, 81, respectively, that are adjacent to the open-side portion 69 and generally coplanar.

Referring still to FIGS. 4-6, the cover assembly 15 will be described. The cover assembly 15 includes a first cover plate, generally designated 83, having a first end portion 85 and a second end portion 87, and a second cover plate, generally designated 89, having a first end region 91 and a second end region 93. The first cover plate 83 has a width $W_1$ as shown in FIG. 4. An important aspect of the cover assembly 15 is that the first cover plate 83 is in pivotal engagement with both the housing 13 and the second cover plate 89. The first end portion 85 of the first cover plate 83 is in pivotal engagement with the lip 71 of the housing 13. In the subject embodiment, a hinge 95 provides the pivotal engagement between the lip 71 and the first end portion 85 of the first cover plate 83. While the first cover plate 83 has been described and shown as being in pivotal engagement with the lip 71, it will be understood by those skilled in the art that the scope of the present invention is not limited to the first cover plate 83 being in pivotal engagement with the lip 71, as the first cover plate 83 could be in pivotal engagement with other components of the housing 13, including but not limited to the base 45. As previously stated, the first cover plate 83 is also in pivotal engagement with the second cover plate 89. In the subject embodiment, the second end portion 87 of the first cover plate 83 is in pivotal engagement with the first end region 91 of the second cover plate 89, with a hinge 97 providing that pivotal engagement.

A third cover plate, generally designated 99, having a first end 101 and a second end 103, is also pivotally engaged with the housing 13. The first end 101 of the third cover plate 99 is pivotally engaged with the third sidewall 53, with a hinge 105 providing the pivotal engagement.

Referring still to FIGS. 4-6, the cover assembly 15 and the third cover plate 99 are shown in an open position. To close the cover assembly 15, the first cover plate 83 is pivoted about the hinge 95 until the first cover plate 83 abuts the side edges 79, 81 of the first and second sidewalls 47, 49, respectively. With the first cover plate in the closed position, the first cover plate 83 blocks entry into the open-side portion 69 of the housing 13. The second cover plate 89 is then pivoted about the hinge 97 until the second cover plate 89 abuts the front edges 73, 75 of the first and second sidewalls 47, 49, respectively. In the subject embodiment, the second end region 93 of the second cover plate 89 abuts a portion of the front edge 77 of the bulkhead 29. With the second cover plate 89 in the closed position (as shown in FIG. 1), access to the second region 59 of the interior region 55 of the housing 13 through the open-front portion 56 is blocked by the second cover plate 89. In order to ensure proper closure of the second cover plate 89, the width $W_1$ of the first cover plate 83 should be about equal to the width W of the open-side portion 69 as this will allow the second cover plate 89 to rest uniformly on the front edges 73, 75 of the first and second sidewalls 47, 49, respectively.

To close the third cover plate 99, the third cover plate 99 is pivoted about the hinge 105 until the third cover plate 99 abuts the front edges 73, 75 of the first and second sidewalls 47, 49, respectively. In the subject embodiment, the second end 103 of the third cover plate 99 abuts a portion of the front edge 77 of the bulkhead 29. With the third cover plate 99 in the closed position (as shown in FIG. 1), access to the first region 57 of the interior region 55 of the housing 13 through the open-front portion 56 is blocked by the third cover plate 99.

In the subject embodiment, the fiber optic enclosure 11 provides controlled access to the interior region 55 of the housing 13. The controlled access is provided by locking mechanisms, generally designated 107, disposed on the second end region 93 of the second cover plate 89 and the second end 103 of the third cover plate 99. In a preferred embodiment, the locking mechanisms 107 require a key. The locking mechanisms 107 have a catch 109 that engages a locking receptacle 111 (best shown in FIG. 8) in the bulkhead 29. As both the second cover plate 89 and the third cover plate 99 are described as having a locking mechanism 107 in the subject embodiment, the locking receptacle 111 is disposed on both the second side 37 and the first side 27 of the bulkhead 29. In the subject embodiment, controlled access to each of the first and second regions 57, 59 of the interior region 55 could be granted to individual technicians since the second cover plate 89 encloses the second region 59 of the interior region 55 and the third cover plate 99 encloses the first region 57. In addition to the locking mechanism 107, the first cover plate 83 includes a conventional latching mechanism 113 (shown only in FIG. 4). The latching mechanism 113 engages the side edge 81 of the second sidewall 49 when the first cover plate 83 abuts the side edges 79, 81 of the first and second sidewalls 47, 49. The engagement of the latching mechanism 113 and the side edge 81 of the second sidewall 49 prevents inadvertent opening of the first cover plate 83. It will be understood by those skilled in the art, however, that the scope of the present invention is not limited to the use of locking mechanisms 107 and latching mechanisms 113.

Figure 7:
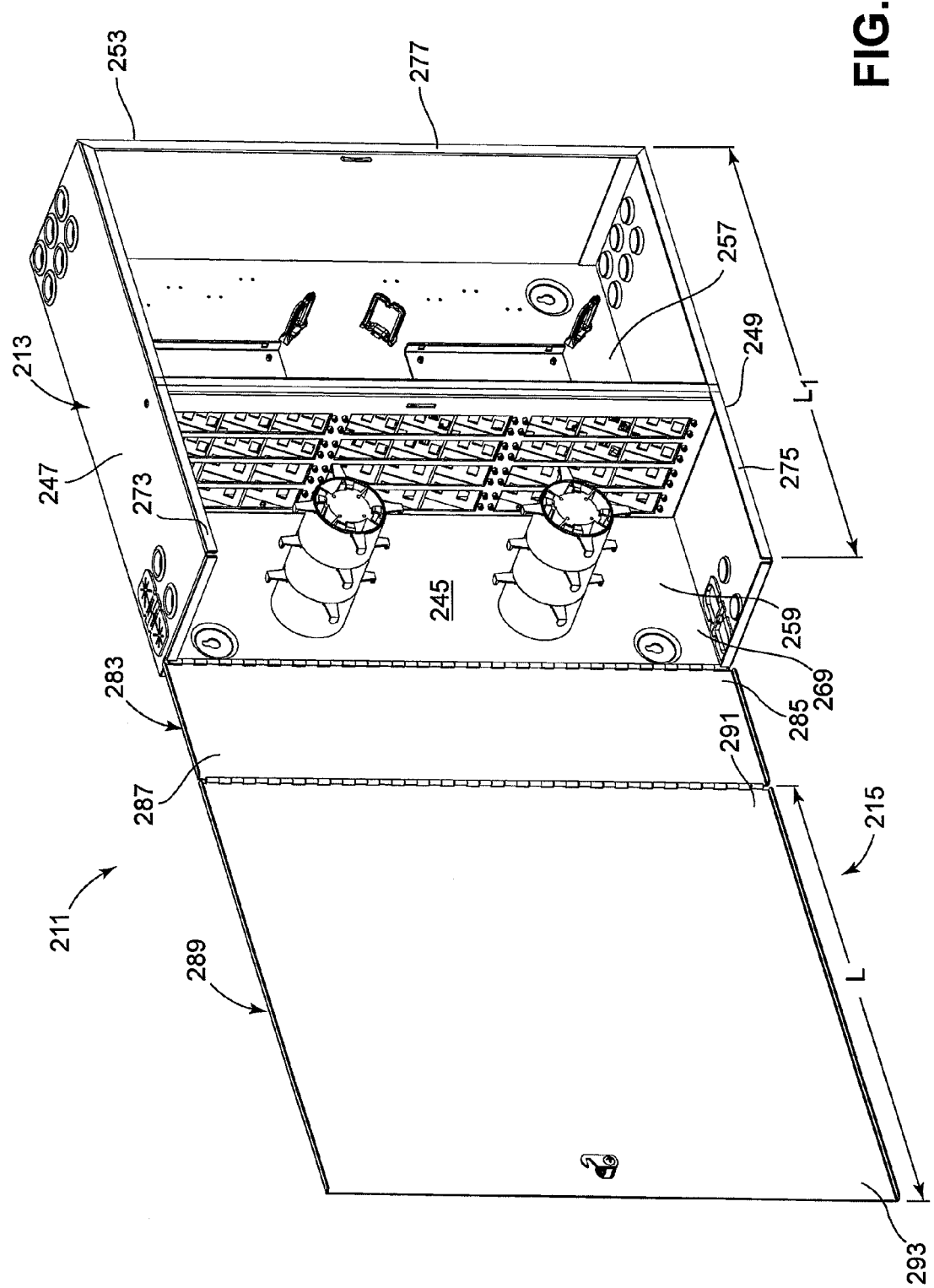
FIG. 7 is a perspective view of an alternate embodiment of a fiber optic enclosure made in accordance with the present invention.

Referring now to FIG. 7, an alternate embodiment of a fiber optic enclosure 211 is shown. In this alternate embodiment, the fiber optic enclosure 211 includes a housing, generally designated 213, and a cover assembly, generally designated 215. The housing 213 includes a base 245 having a first sidewall 247 and an oppositely disposed second sidewall 249 that extend generally perpendicularly from the outer periphery of the base 245. The housing 213 further includes a third sidewall 253 that extends generally perpendicularly from the outer periphery of the base 245 and is in connected engagement with the first and second sidewalls 247, 249. The base 245 and the first, second, and third sidewalls 247, 249, 253 of the housing 213 define an interior region, generally designated 255. The interior region 255 of the housing 213 includes a first region 257 and a second region 259. The first region 257 is separated from the second region 259 by a bulkhead 229, which traverses the interior region 255 of the housing 213 between the first and second sidewalls 247, 249. The base 245 and the first and second sidewalls 247, 249 further define an open-side portion 269 oppositely disposed from the third sidewall 253. The first, second, and third sidewalls 247, 249, 253 include front edges 273, 275, 277 that are generally coplanar. The first and second sidewalls 247, 249 also include side edges 279, 281 that are oppositely disposed from the third sidewall 253 and generally coplanar.

The cover assembly 215 includes a first cover plate, generally designated 283, having a first end portion 285 and a second end portion 287, and a second cover plate, generally designated 289, having a first end region 291 and a second end region 293. The first cover plate 283 of the cover assembly 215 is in pivotal engagement with both the housing 213 and the second cover plate 289. The first end portion 285 of the first cover plate 283 is in pivotal engagement with the housing 213. In the subject embodiment, a hinge 295 provides the pivotal engagement between the housing 213 and the first end portion 285 of the first cover plate 283. The second end portion 287 of the first cover plate 283 is in pivotal engagement with the first end region 291 of the second cover plate 289, with a hinge 297 providing that pivotal engagement.

To close the cover assembly 215, the first cover plate 283 is pivoted about the hinge 295 until the first cover plate 283 abuts the side edges 279, 281 of the first and second sidewalls 247, 249, respectively. With the first cover plate 283 in the closed position, the first cover plate 283 closes the open-side portion 269 of the housing 213. The second cover plate 289 is pivoted about the hinge 297 until the second cover plate 289 abuts the front edges 273, 275, 277 of the first, second, and third sidewalls 247, 249, 253, respectively. As a length L of the second cover plate 289 is about equal to a length $L_1$ of the first and second sidewalls 247, 249, the first and second regions 257, 259 of the interior region 255 are completely enclosed when the second cover plate 289 is in the closed position.

Figure 8:
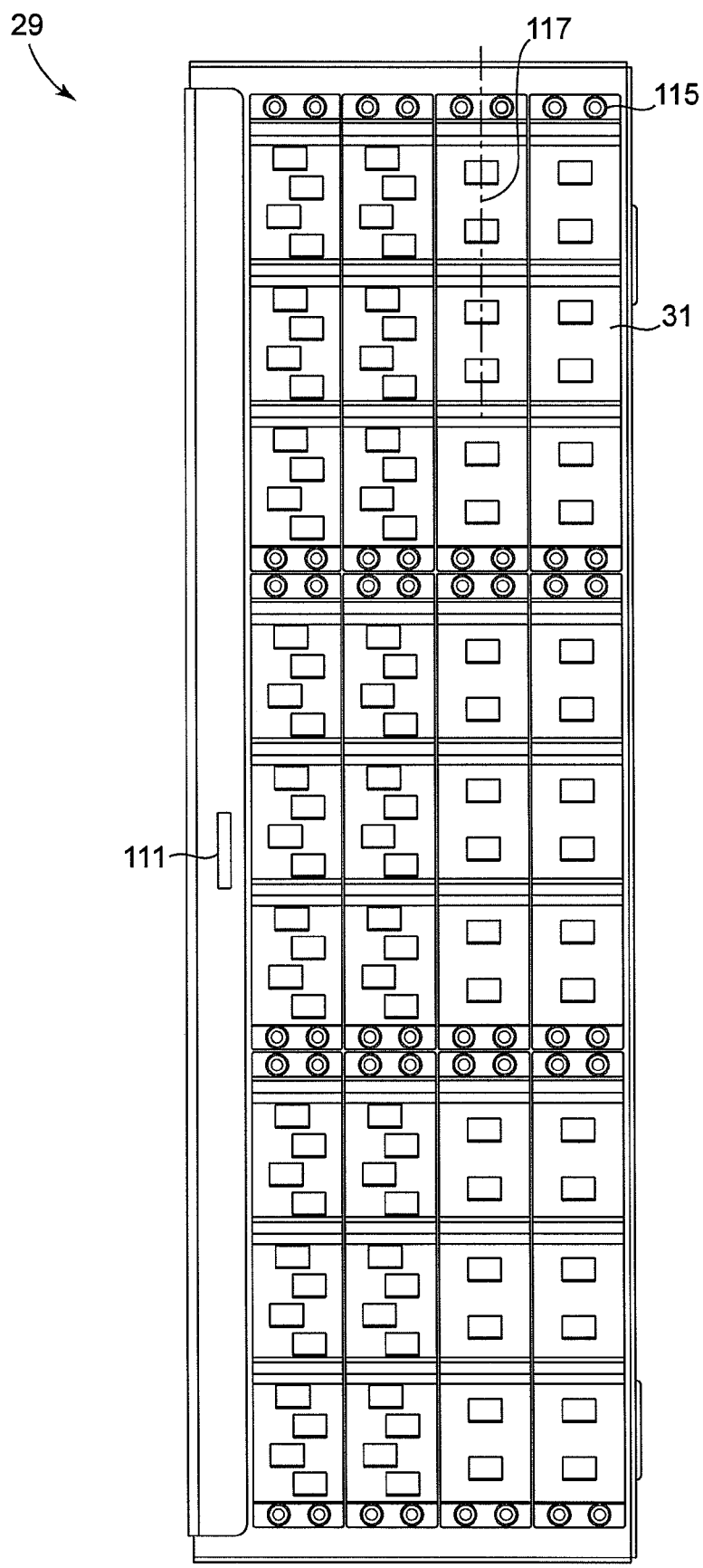
FIG. 8 is view of a bulkhead taken on line 8-8 in FIG. 5.

Referring now to FIG. 8, the bulkhead 29 will be described. The bulkhead 29 includes adapter plates 31. In the subject embodiment, and by way of example only, the bulkhead 29 includes twelve adapter plates 31, which are arranged in three rows and four columns. The adapter plates 31 are connectedly engaged to the bulkhead 29 by a plurality of fasteners 115.

Figure 12:
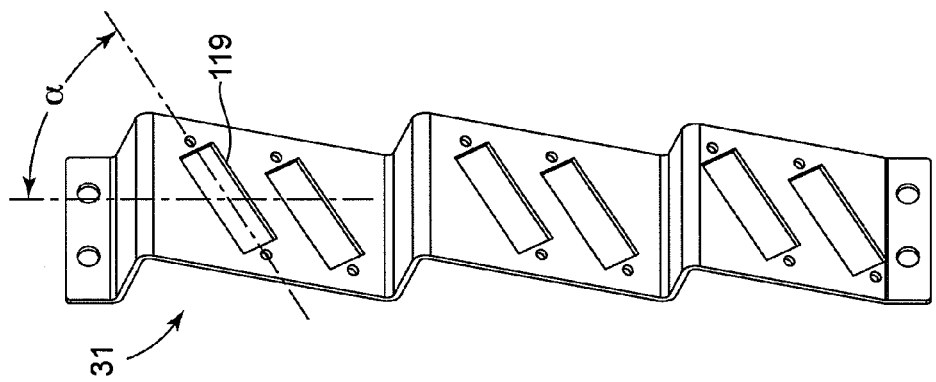
FIG. 12 is an alternate embodiment of an adapter plate of the bulkhead of FIG. 8.
Figure 11:
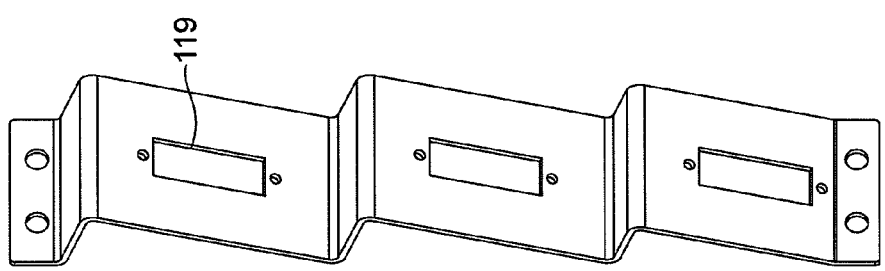
FIG. 11 is an alternate embodiment of an adapter plate of the bulkhead of FIG. 8.
Figure 10:
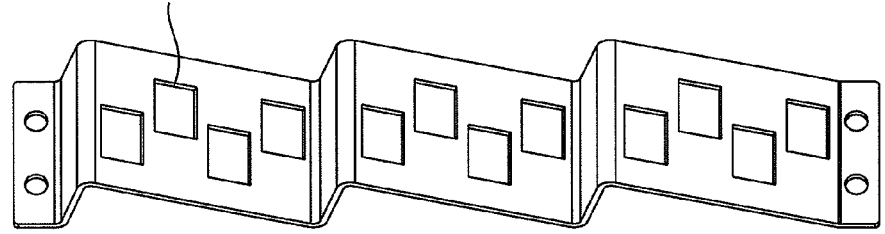
FIG. 10 is an alternate embodiment of an adapter plate of the bulkhead of FIG. 8.

Referring now to FIGS. 9-15, the adapter plates 31 will be described in greater detail. Each adapter plate 31 includes a longitudinal axis 117 (shown in FIG. 8) and a plurality of adapter ports 119. The adapter ports 119 are disposed in the adapter plate 31 along the longitudinal axis 117. Different configurations of the adapter ports 119 can be used in the adapter plate 31 to accept a variety of different fiber optic adapters. For example, in FIG. 9, six adapter ports 119 are aligned with the longitudinal axis and are configured to accept SC-type adapters, whereas in FIG. 10, twelve adapter ports 119 are configured to accept SC-type adapters with each subsequent adapter port 119 being oppositely offset from the longitudinal axis 117 from the immediately preceding adapter port 119. In FIG. 11, six adapter ports 119 are configured to accept SC duplex-type adapters with the adapter ports 119 aligned with the longitudinal axis 117. The six adapter ports 119 in FIG. 12 are also configured to accept SC duplex-type adapters. However, the adapter ports 119 are oriented at an angle α from the longitudinal axis 117. In FIG. 13, six adapter ports 119 are configured to accept ST-type adapters with each of the adapter ports 119 aligned with the longitudinal axis 117. FIG. 14, on the other hand, provides twelve adapter ports 119 that are configured to accept ST-type adapters with each subsequent adapter port 119 being oppositely offset from the longitudinal axis 117.

Figure 9:
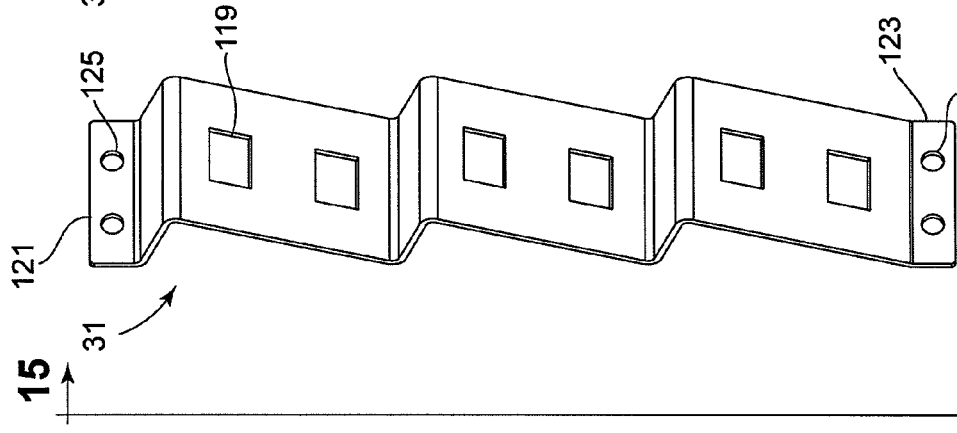
FIG. 9 is a perspective view of an adapter plate of the bulkhead of FIG. 8.

Referring now primarily to FIG. 15, the adapter plate 31 includes a first and second mounting portion 121, 123 with each having a plurality of mounting holes 125 (shown in FIG. 9). The adapter plate 31 also includes a stepped surface 127, in which are disposed the adapter ports 119.

Figure 16:
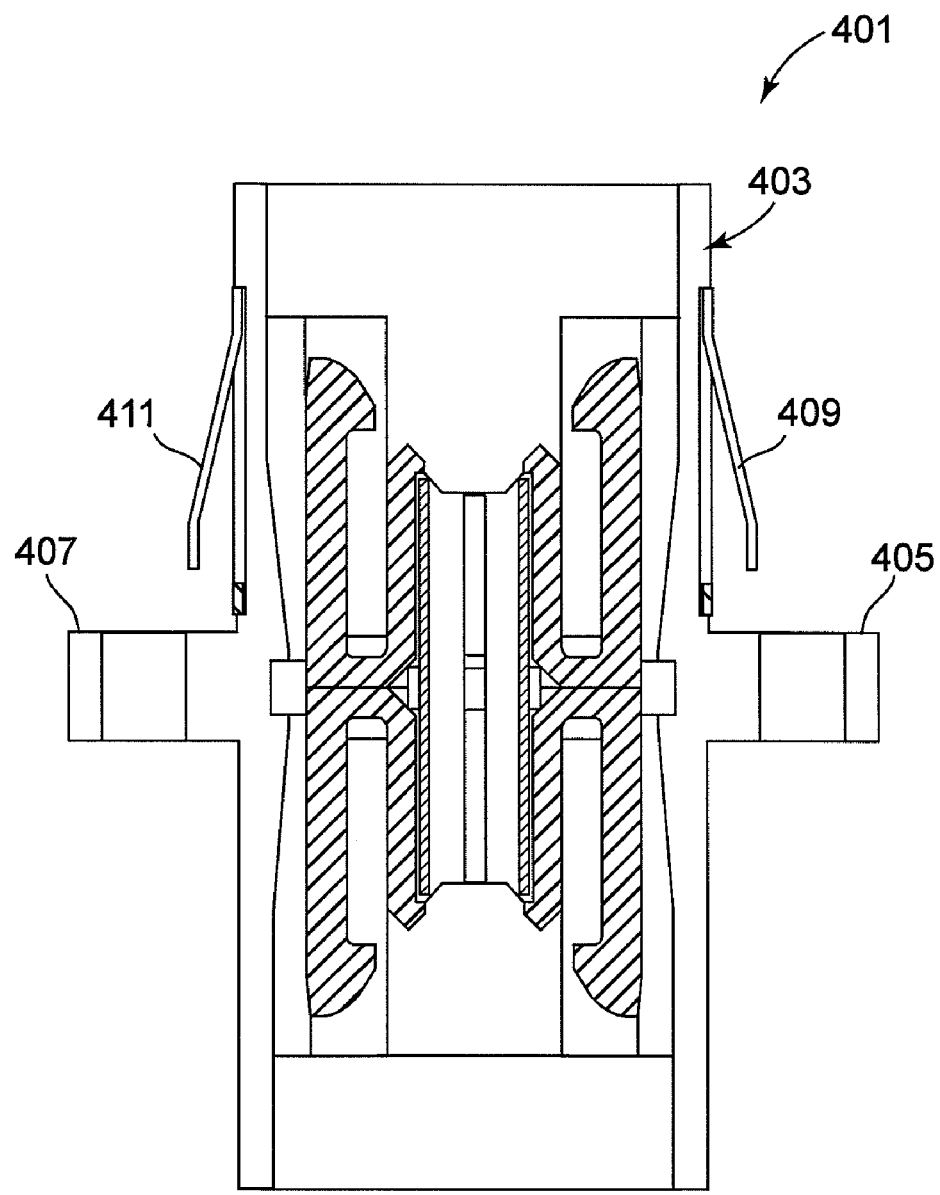
FIG. 16 is a cross-sectional view of an SC-type adapter compatible for use with the adapter plates of FIGS. 9 and 10.

Referring now to FIG. 16, an SC-type adapter 401 for holding two fiber optic connectors in coaxial alignment is shown. The SC-type adapter shown in FIG. 16 could be used with the adapter plates 31 shown in FIGS. 9 and 10. As the SC-type adapter 401 was described in U.S. Pat. No. 5,317,663, which is assigned to the assignee of the present invention and incorporated herein by reference, the SC-type adapter will only be briefly described herein. The SC-type adapter includes a main body 403 with a pair of tabs 405, 407 located on the exterior of the main body 403. The tabs 405, 407 serve to support the adapter 401 in the adapter plate 31. The adapter 401 further includes a pair of retaining clips 409, 411, with one retaining clip 409, 411 associated with each tab 405, 407. A front side 413 of the adapter 401 is inserted into the adapter port 119 of the adapter plate 31. As the adapter 401 is inserted through the adapter port 119, the retaining clips compress against the main body 405. The adapter is inserted into the adapter port 119 until the tabs 405, 407 abut the adapter plate 31. With the tabs 405, 407 abutting the adapter plate 31, the retaining clips 409, 411 decompress on the opposite side of the adapter plate 31, thereby retaining the adapter plate 31 between the retaining clips 409, 411 and the tabs 405, 407.

Referring again to FIG. 4, the installation and operation of the fiber optic enclosure 11 will be described. In the subject embodiment, the fiber optic enclosure 11 is mounted to a wall using a plurality of mounts 129 (e.g., mounting openings for receiving fasteners such as screws, lag bolts, etc.) disposed on the base 45 of the housing 13. The multi-pivotal engagement of the first cover plate 83 with the housing 13 and the second cover plate 89 of the cover assembly 15 allows for great flexibility in mounting locations for the fiber optic enclosure 11. For example, the fiber optic enclosure 11 could be mounted to a wall in a corner with the first cover plate 83 adjacent to an abutting wall or in the alternative the fiber optic enclosure 11 could be mounted next to another fiber optic enclosure 11 with the first cover plate 83 adjacent to a sidewall of the other fiber optic enclosure 11. In this situation, the second cover plate 89 can be opened to provide full access to the interior region 55 of the housing while the first cover plate 83 remains closed. As stated previously, the latch mechanism 113 would provide assurance that the first cover plate 83 would not inadvertently open and potentially damage the abutting wall or sidewall of the adjacent fiber optic enclosure 11. In the alternative, the fiber optic enclosure could be mounted to a wall with clearance on both sides of the fiber optic enclosure 11. In this situation, the first and second cover plates 83, 89 can be opened to provide access to the interior region 55 of the housing 13. With the first and second cover plates 83, 89 in the open position, greater access to the interior region 55 of the housing is provided since access to the interior region 55 is provided through the open-side portion 69 of the housing 13.

One of the many potential advantages of the subject embodiment of the present invention concerns the flexibility in placement of the fiber optic enclosure 11. As previously stated, the multi-pivotal cover assembly 15 allows clear access to the interior region 55 of the housing 13 regardless of where the fiber optic enclosure 11 is located.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A fiber optic enclosure for enclosing optical fiber connections comprising:
    a housing including a base, a first sidewall, an oppositely disposed second sidewall, and a third sidewall connectedly engaged with the first and second sidewall, the first, second and third sidewalls extending outwardly from the base, wherein the base and the first, second and third sidewalls define an interior region with an open-front portion and an open-side portion;
    a bulkhead disposed in the interior region of the housing, wherein the bulkhead separates the interior region into a first portion and a second portion;
    a cover assembly having a first cover plate and a second cover plate, the first cover plate having a first end portion pivotally engaged with the housing and a second end portion pivotally engaged with the second cover plate, wherein the first cover plate closes the open-side portion of the housing and the second cover plate closes at least a portion of the open-front portion of the housing when the cover assembly is in a closed position; and
    a third cover plate connectedly engaged with the third sidewall, wherein the cover assembly and the third cover plate cooperatively enclose the interior region of the housing when in a closed position.

2. A fiber optic enclosure as claimed in claim 1, wherein the first end portion of the first cover plate is hingedly engaged with the housing.

3. A fiber optic enclosure as claimed in claim 2, wherein the first end portion of the first cover plate is hingedly engaged with the base of the housing.

4. A fiber optic enclosure as claimed in claim 3, wherein the second end portion of the first cover plate is hingedly engaged with the second cover plate.

5. A fiber optic enclosure as claimed in claim 1, further comprising a plurality of splice tray mounts disposed in the first portion of the interior region.

6. A fiber optic enclosure as claimed in claim 5, further comprising a plurality of cable spools disposed in the second portion of the interior region.

7. A fiber optic enclosure as claimed in claim 1, wherein the third cover plate encloses the first portion of the interior region and the cover plate assembly encloses the second portion of the interior region.

8. A fiber optic enclosure as claimed in claim 1, wherein the bulkhead includes a plurality of adapter plates.

9. A fiber optic enclosure as claimed in claim 8, wherein the adapter plates include a plurality of adapter ports disposed along a longitudinal axis of the adapter plate.

10. A fiber optic enclosure as claimed in claim 9, wherein the adapter ports are aligned with the longitudinal axis.

11. A fiber optic enclosure for enclosing optical fiber connections comprising:

a housing including a base, a first sidewall and an oppositely disposed second sidewall, the first and second sidewalls extending outwardly from the base, wherein the base and the first and second sidewalls define an interior region with an open-front portion and an open-side portion;

a bulkhead disposed in the interior region of the housing, the bulkhead including a plurality of adapter plates, the adapter plates defining a longitudinal axis and a plurality of adapter ports, wherein the adapter ports are offset from the longitudinal axis; and a cover assembly having a first cover plate and a second cover plate, the first cover plate having a first end portion pivotally engaged with the housing and a second end portion pivotally engaged with the second cover plate, wherein the first cover plate closes the open-side portion of the housing and the second cover plate closes at least a portion of the open-front portion of the housing when the cover assembly is in a closed position.

12. A fiber optic enclosure as claimed in claim 11, wherein subsequent adapter ports are disposed in a direction opposite from the immediately preceding adapter hole.

* * * * *